July 26, 1966  D. W. BARGEN ET AL  3,263,158
SATURABLE REACTOR VOLTAGE CONTROL CIRCUIT
Filed Aug. 15, 1963
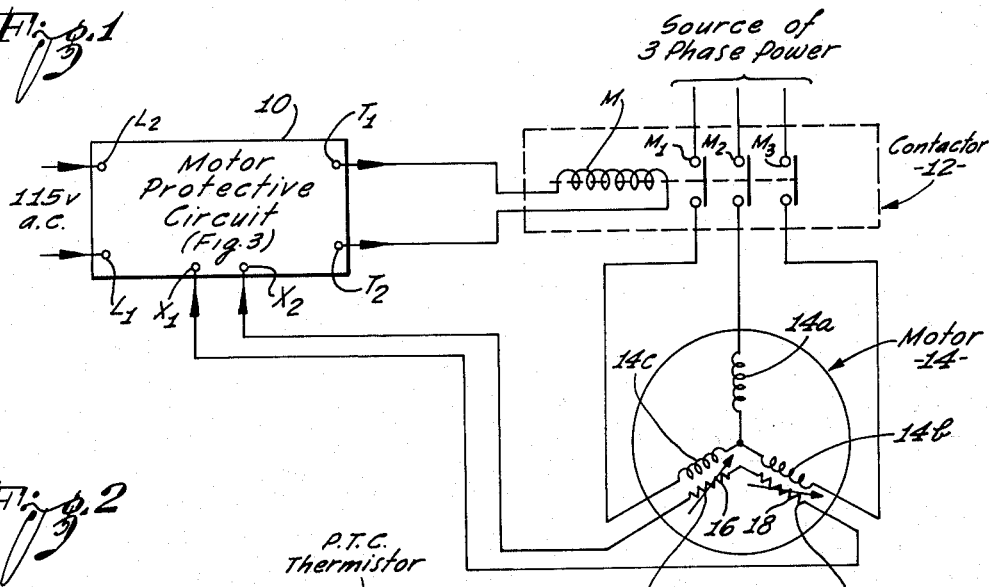
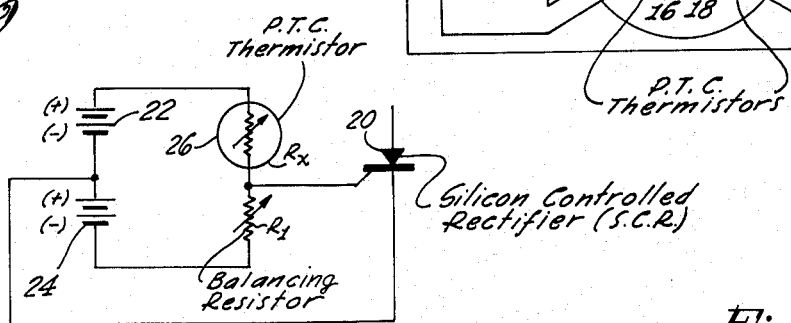
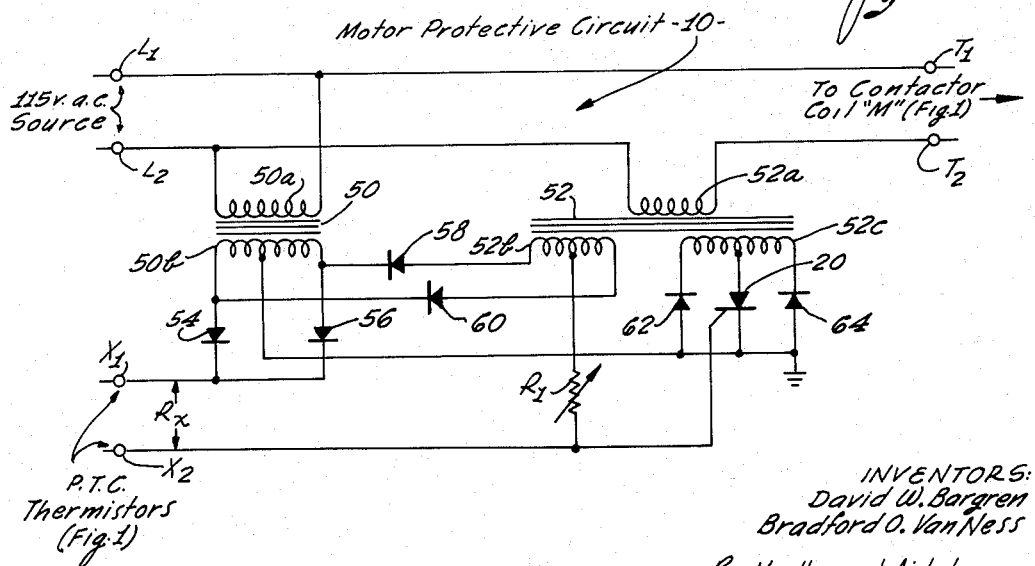
INVENTORS:
David W. Bargren
Bradford O. Van Ness
By Mueller and Aichele
Attorney

United States Patent Office 3,263,158
Patented July 26, 1966

3,263,158
SATURABLE REACTOR VOLTAGE
CONTROL CIRCUIT
David W. Bargen, Scottsdale, and Bradford O. Van Ness, Phoenix, Ariz., assignors to Motorola, Inc., Chicago, Ill., a corporation of Illinois
Filed Aug. 15, 1963, Ser. No. 302,409
7 Claims. (Cl. 323—44)

The present invention relates generally to control electric systems for electrical equipment, and it relates more particularly to an improved protective system for use in conjunction with positive temperature coefficient thermistors for de-energizing an electric motor when the temperature of the motor windings exceeds a predetermined maximum threshold.

It is usual in the prior art to provide control circuits for electric motors, and the like, for protecting the motors from the effects of overheating. These prior art systems usually include thermal overload relays, each of which, in turn, usually includes a terminal responsive unit. The thermal responsive unit is a bi-metallic element which is heated directly, or indirectly, by the electric current in the windings of the motor to be protected.

The prior art thermal protective systems described briefly in the previous paragraph are not entirely satisfactory, mainly because the thermal characteristics of the relay do not match the thermal characteristics of the machine to be protected.

Because of the above noted inadequacies of the thermal type of relays in motor protection systems, other equivalent types of thermal protective circuits have been developed in the prior art. These latter circuits respond directly to the heat generated by the windings of the motor to be protected. The latter type of prior art motor protective system is preferable because it can be made to respond directly to the temperature of the windings of the protected motor, and to de-energize the motor windings when the temperature thereof exceeds a predetermined safe maximum threshold.

An improved type of the latter prior art system has been made commercially practicable by the provision of the relatively inexpensive positive temperature coefficient thermistor. This thermistor exhibits a small change in its resistance in the positive sense for increases in temperatures in the normal temperature range usually encountered in electric motor windings when the motor is running under normal conditions. However, the positive temperature coefficient thermistor referred to above has switch-like characteristics, and it exhibits a large increase in resistance when the winding temperature of the motor increases to an abnormally high level indicative of a malfunction therein.

Thermistors of this type are described, for example, in British Patent 714,965, dated September 8, 1954, and in an article by H. A. Sauer and S. S. Flaschen, Proceedings Components Symposium, May 1, 1956, pages 41–46.

The present invention provides a solid state control circuit which has particular utility in motor protective systems of the type described above for operation in conjunction with positive temperature coefficient thermistors. For that reason, the control circuit of the invention will be described in such an environment. It will become evident as the description proceeds, however, that the control circuit of the invention has general utility in the control or protection of electrical equipment, and that it can be made to respond to a wide variety of sensors, other than temperature responsive elements.

It is, accordingly, an object of the invention to provide an improved control circuit which is capable of controlling the current through an electric circuit in response to variations in the impedance of a sensing transducer element coupled thereto.

A more particular object of the present invention is to provide an improved thermal protective and/or control circuit for electric motors and the like, which responds to resistance increases of a thermal responsive element, such as a positive temperature coefficient thermistor, to provide a desired control effect.

Another object of the invention is to provide such an improved control circuit which utilizes solid state elements and thereby obviates the necessity for mechanically moving parts or contacts.

Another object of the invention is to provide such an improved control circuit which is capable of controlling relatively heavy loads in response to relatively low level signals.

Another object of the invention is to provide such an improved solid state control circuit in which the solid state element thereof is completely isolated from the line voltage; so that a relatively inexpensive, low voltage solid state element can be used in conjunction with relatively high line voltages.

Yet another object of the invention is to provide such an improved solid state control circuit in which the sensing and control circuits and all the solid state active units may be operated at relatively low voltages.

A still further object of the invention is to provide such an improved protective and/or control circuit which exhibits electronic "hysteresis" in the form of a desirable lag between its "drop out" and "pull in" operational modes, so as to avoid chatter of the controlled contactor and other undesirable effects.

Other objects and advantages of the invention will become apparent from a consideration of the following description, when the description is read in conjunction with the accompanying drawings, in which:

FIGURE 1 is a diagram, partly in block form and partly in circuit form, illustrating the manner in which the protective circuit of the present invention may be utilized to protect a three-phase electric motor;

FIGURE 2 is a fragmentary circuit diagram useful in explaining the control circuit concept of the present invention and representing the basic principles on which the concept is predicated; and FIGURE 3 is a circuit diagram of one form of the control circuit of the invention.

As mentioned above, although the control circuit of the present invention is illustrated herein as forming a protective means for an electric motor, the control circuit may have a wide variety of uses. The circuit basically is one which responds to an increase in resistance so as to provide a decrease in current flow from a source to a controlled element. However, it will be evident as the description proceeds, that the circuit may be constructed to respond to a decrease in resistance so as to achieve this purpose. Moreover, the control circuit of the present invention may be used, not only to control a contactor associated with an electric motor, as will be described herein, but to control the motor directly, or to control any other electrical instrumentality which is to be protected or controlled.

In the circuit of FIGURE 1, the control circuit of the invention is designated as a motor protective circuit 10. The protective circuit 10 includes a pair of input terminals $L_1$ and $L_2$, and these input terminals may be connected to an appropriate alternating-current voltage source, such as a 115 volt alternating-current source, so as to provide energy for the element controlled by the protective circuit.

The motor protective circuit 10 also includes a pair of output terminals $T_1$ and $T_2$. In the illustrated embodiment, these output terminals are shown as connected to the actuating coil M of a contactor 12. The contactor 12 is illustrated as interposed in a three-phase line, and it includes three normally open contacts $M_1$, $M_2$ and $M_3$.

During normal operation of the system, the coil M of the contactor is energized, and it holds the three contacts $M_1$, $M_2$ and $M_3$ closed. The three-phase line supplies power to an usual three-phase motor 14. The motor 14 is energized, so long as the contacts $M_1$, $M_2$ and $M_3$ are held closed. The motor is shown schematically as including the usual Y-connected field winding 14a, 14b and 14c.

In the practice of one embodiment of the invention, a pair of positive temperature coefficient thermistors are embedded in two of the field windings 14b and 14c of the motor 14, and these thermistors are designated 16 and 18. The thermistors 16 and 18 are connected in series, and the series string is connected to control terminals $X_1$ and $X_2$ of the motor protective circuit 10.

It is to be understood, of course, that the thermistors 16 and 18 could be placed at other portions of the motor 14, and that more or less of these thermistors could be used. The purpose of the thermistors is to respond to any abnormal increase in temperature in the motor, so as to exhibit a substantial increase in resistance and thereby to provide a control effect for the motor protective circuit 10. This control effect, as will be described, causes the circuit 10 to de-energize the winding M of the contactor and open the contacts $M_1$, $M_2$ and $M_3$.

As mentioned above, the fragmentary circuit of FIGURE 2 represents the basic principles on which the circuit 10 of the present invention is based. As will be described in conjunction with FIGURE 3, the motor protective or control circuit 10 includes a solid state switching device such as a silicon controlled rectifier 20. The silicon controlled rectifier has the usual anode, cathode and gate electrodes. In the practice of the system of the present invention, the silicon controlled rectifier 20 is normally conductive. Then, when an abnormal condition arises, such as an increase of temperature, the silicon controlled rectifier is rendered non-conductive.

The control circuit of the invention may be considered as including a pair of unidirectional potential sources 22 and 24 (FIGURE 2). The negative terminal of the source 22 is connected to the positive terminal of the source 24. It will become evident from the description of the circuit of FIGURE 3, that these unidirectional sources 22 and 24 actually produce unfiltered pulsating direct-current potentials derived from rectifying diodes.

The negative terminal of the source 24 is connected to the gate electrode of the silicon controlled rectifier 20 through a balancing resistor $R_1$. The positive terminal of the source 24, and negative terminal of the source 22, are connected to the cathode of the device 20. A positive temperature coefficient thermistor, designated 26 in FIGURE 2, but which may be the series string thermistors 16 and 18 of FIGURE 1, connects the positive terminal of the source 22 to the gate electrode of the silicon controlled rectifier 20.

Under normal operation conditions, the resistance of the thermistor 26 is relatively low, compared with the resistance of $R_1$, so that positive potential from the source 22 is applied to the gate electrode of the silicon controlled rectifier 20. If the value of the balancing resistor $R_1$ is made somewhat higher than the thermistor resistance $R_n$, the net bias on the gate electrode will be positive, so that the silicon controlled rectifier will be conductive.

However, in the event that the resistance of the thermistor 26 increases materially, due to an abnormal temperature rise in the protected equipment, the bias on the gate electrode of the silicon controlled rectifier 20 will swing negative, so that the silicon controlled rectifier will be cut-off.

A control circuit constructed in accordance with one embodiment of the invention is shown in FIGURE 3. An important feature of the circuit of FIGURE 3 is that the silicon controlled rectifier 20 illustrated therein is completely isolated from the line. This means that inexpensive silicon controlled rectifiers, or equivalent switching devices, having relatively low voltage characteristics may be used in conjunction with a relatively high line voltage.

Another feature of the circuit of FIGURE 3 is the fact that it exhibits electronic "hysteresis." That is, the circuit requires a lower resistance to achieve its "pull-in" operational mode, than required for its "drop-out" mode. This permits a lag between the "on" and "off" operation of the system which, as mentioned above, obviates chatter of the contactor contacts, and other undersirable effects.

As described above, the motor protective circuit 10 of FIGURE 3 includes a pair of input terminals $L_1$ and $L_2$, and it includes a pair of output terminals $T_1$ and $T_2$. The input terminals $L_1$ and $L_2$ are connected to an appropriate voltage source, such as the usual 115-volt alternating-current line. The output terminals $T_1$ and $T_2$ may be connected, for example, to the coil M of the contactor 12 in FIGURE 1.

The protective or control circuit of FIGURE 3 includes a first transformer 50 which has a primary winding 50a connected to the input terminals $L_1$ and $L_2$ so as to be energized by the power from the alternating-current source. The circuit also includes a second transformer 52 which has a primary winding 52a connected in the series in the connection between the input terminals $L_1$, $L_2$ and the output terminals $T_1$ and $T_2$.

As will be described, under normal operating conditions, the primary winding 52a of the transformer 52 exhibits a relatively low impedance. This means that sufficient current is supplied to the coil M of the contactor 12 in FIGURE 1 to maintain the contactor contacts $M_1$, $M_2$ and $M_3$ in a closed condition. However, upon the occurrence of an abnormal temperature rise in the protected equipment, the impedance of the primary winding 52a of the transformer 52 rises due to the switching off of the controlled rectifier 20, as will be described, so that insufficient current flows in the coil M to maintain the circuit breaker contacts closed and the circuit enters its "drop-out" operational mode. This latter mode continues until the abnormal temperature rise disappears.

Due to the above mentioned electronic hysteresis effect, a lag is provided (in a manner to be described) between the drop-out and pull-in operational modes of the circuit. This means that the abnormal temperature rise which created the initial condition must be reduced appreciably before the circuit will again enter its pull-in mode, so as to energize again the contactor coil M.

The transformer 50 has a secondary winding 50b. A pair of diode rectifiers 54 and 56 have their anodes connected to the respective extremities of the secondary winding of the transformer 50. The cathodes of the diodes 54 and 56 are both connected to the control terminal $X_1$. The other control terminal $X_2$ is connected to the balancing resistor $R_1$ and to the gate electrode of the silicon controlled rectifier 20.

The transformer 52 has a first secondary winding 52b and a second secondary winding 52c. The balancing resistor $R_1$ is connected to an intermediate tap on the secondary winding 52b of the transformer 52. A pair of diodes 58 and 60 have their anodes connected to the extremities of the secondary winding 52b, and their cathodes connected respectively to the extremities of the secondary winding 50b.

An intermediate tap on the secondary winding 50b is connected to the anodes of a pair of diode rectifiers 62 and 64 and to the cathode of the silicon controlled rectifier 20. This latter connection may be grounded, if so desired, as shown. However, the control system may be "floating" if so desired. The cathode of the diode rectifiers 62 and 64 are connected respectively to the extremities of the secondary winding 52c, and the anode of the silicon controlled rectifier 20 is connected to an intermediate tap on the winding.

As will be described, the transformer 52 functions as a variable impedance. A transformer with low losses and close coupling between the primary winding 52a and the secondary winding 52c is suitable for the purpose.

Under normal conditions, the silicon controlled rectifier 20 is conductive, as mentioned above, so as to short-circuit alternate halves of the secondary winding 52c to the alternating current voltage induced across the secondary by the current through the primary winding 52a. This means that the impedance of the primary winding 52a is relatively low, so that sufficient current is supplied to the coil M of the contactor 12 in FIGURE 1 to cause the contacts to close.

However, when an abnormal condition occurs, the silicon controlled rectifier 20 is rendered non-conductive, and the impedance in the primary winding 52a rises appreciably. For this latter condition, there is insufficient current flow from the input terminals $L_1$ and $L_2$ of the circuit 10 to the output terminals $T_1$ and $T_2$ through the coil M so as to hold the contactor contacts closed. Therefore, the contactor trips.

The control effect which causes the silicon controlled rectifier to become non-conductive is rendered by the thermistors 16 and 18, for example, which are connected as a series string across the terminals $X_1$ and $X_2$, the resistance of which is designated $R_x$. So long as the resistance $R_x$ of these thermistors is relatively low, compared with the resistance of $R_1$, a net positive bias is applied from the secondary winding 50b and through a half bridge network, composed of the diode rectifiers 54 and 56 and the resistance $R_x$ exhibited by thermistors, to the gate electrode of the silicon controlled rectifier 20 so as to maintain the silicon controlled rectifier conductive.

The positive voltage introduced by the bridge network circuit elements mentioned in the previous paragraph, is greater than the negative voltage produced by the other half of the bridge network from the secondary winding 50b; the latter half of the bridge network being composed of the diode rectifiers 58 and 60, and the balancing resistor $R_1$. The balancing resistor $R_1$ is adjusted so that its value is greater than $R_x$ at normal winding temperatures to assure that the net bias on the gate electrode of the silicon controlled rectifier 20 is positive during normal operating conditions.

However, when an increase in temperature, or other monitored effects, causes the resistance $R_x$ to increase above $R_1$, the aforementioned bridge network is unbalanced in the opposite direction. The net bias on the gate electrode of the silicon controlled rectifier 20 is then driven negative, due to the negative potential applied through the portion of the bridge network including the balancing resistor $R_1$. Therefore, under the latter condition, the silicon controlled rectifier 20 is rendered non-conductive.

The secondary winding 52b of the transformer 52 provides the aforementioned electronic hysteresis effect. During normal operation, the winding 52c of the transformer 52 is short-circuited by the conduction of the silicon controlled-rectifier 20 so that relatively little voltage is induced in winding 52b. Thus the voltage across the balancing resistor $R_1$ is essentially the direct-current voltage derived through the diode rectifiers 58 and 60 from the secondary winding 50b of the other transformer 50. When the silicon controlled-rectifier is rendered non-conductive by an increase in $R_x$, the reactance of winding 52a becomes much higher than the load reactance of the contactor coil M. Therefore, most of the line voltage across terminals $L_1$ and $L_2$ appears across winding 52a, inducing an appreciable voltage across winding 52b. Winding 52b is phased in such a manner as to increase the negative voltage applied to $R_1$ and thus to the gate of the silicon controlled rectifier 20. In this manner the resistance of the controlling elements $R_x$ must drop to a value lower than the point at which non-conduction of controlled rectifier 20 occurred before the net voltage at the gate terminal of controlled rectifier 20 again becomes positive and conduction of the controlled rectifier resumes. In this manner the desired lag between circuit "drop-out" and "pull-in," or electronic hysteresis effect, is provided.

As mentioned above, although the control circuit of the invention is illustrated as a protective circuit 10 used in conjunction with a contactor system, it is obvious that the control circuit has a wide utility for control and protective applications. Also, although the control circuit is illustrated as responding to a positive resistance change $R_x$, it is obvious that the elements $R_1$ and $R_x$ can be interchanged, so that the control circuit will respond to a negative resistance increment. In other words, negative temperature coefficient thermistors can be used in the modified circuit.

It is also evident that although a particular embodiment of the invention has been shown and described, modifications may be made. The following claims are intended to cover all modifications which fall within the scope of the invention.

What is claimed is:

1. An electric control circuit including in combination: input terminal means for connecting the control circuit to a source of alternating-current voltage; output terminal means, a first transformer having a primary winding connected to said input terminal means and having a secondary winding; a second transformer having a primary winding and having a secondary winding; circuit means including the primary of said second transformer connecting said input terminal means to said output terminal means; switching means connected to said secondary winding of said second transformer for selectively reducing the impedance of the primary winding of said second transformer so as to increase the current flow therethrough; a pair of control terminals for connecting the control circuit across a variable impedance sensing element; means for connecting the secondary winding of said first transformer to one of said control terminals; and means for connecting the other of said control terminals to said switching means to actuate said switching means in response to a variation in the impedance of said sensing element.

2. The control circuit defined in claim 1 in which said switching means comprises a silicon controlled rectifier.

3. An electric control circuit including in combination: input terminal means for connecting the control circuit to a source of alternating-current voltage; output terminal means; a first transformer having a primary winding connected to said input terminal means and having a secondary winding; a second transformer having a primary winding and a secondary winding; circuit means connecting said input terminal means to said output terminal means and including said primary winding of said second transformer; first diode rectifier means connected to said secondary winding of said second transformer and to an intermediate tap on said secondary winding of said first transformer; a silicon controlled rectifier switching device connected to an intermediate tap of said secondary winding of said second transformer and to said first diode rectifier means for selectively reducing the impedance of the primary winding of said second transformer to increase the current flow therethrough; a pair of control terminals for connecting the control circuit across a variable resistance sensing element; a second diode rectifier means for connecting the secondary winding of said first transformer to one of said control terminals; and means for connecting the other of said control terminals to said silicon controlled rectifier switching device to actuate said device in response to a resistance variation in said sensing element.

4. An electric control circuit including in combination: input terminal means for connecting the control circuit to a source of alternating-current voltage; output terminal means; a first transformer having a primary winding connected to said input terminal means and having a secondary winding; a second transformer having a primary winding and a secondary winding; circuit means including the primary winding of said second transformer connecting said input terminal means to said output terminal means; switching means connected to said secondary winding of said second transformer for selectively reducing the impedance of the primary winding of said second transformer to increase the current flow therethrough; a pair of control terminals for connecting the control circuit across a variable resistance sensing element; and bridge network means including first diode rectifier means for connecting the secondary winding of said first transformer to one of said control terminals, second diode rectifier means and balancing resistance means for connecting the secondary winding of said first transformer to said switching means to render said switching means normally conductive, and further means connecting the other of said control terminals to said switching means to render said switching means non-conductive in response to a resistance variation in said sensing element.

5. The control circuit defined in claim 4 in which said second transformer includes a second secondary winding connected in circuit with said balancing resistance means for providing an additional voltage thereacross upon the rendering of the aforesaid switching means non-conductive.

6. An electric control circuit including in combination: input terminal means for connecting the control circuit to a source of alternating-current voltage; output terminal means; a first transformer having a primary winding connected across said input terminal means and having a secondary winding; a second transformer having a primary winding and first and second secondary windings; circuit means including said primary winding of said second transformer connecting said input terminal means to said output terminal means; means including a silicon controlled rectifier switching device connected to said first secondary winding of said second transformer for selectively reducing the impedance of said primary winding of said second transformer to increase the current flow from said input terminal means to said output terminal means; a pair of control terminals for connection to a variable resistance sensing element; and a bridge network including first diode rectifier means connecting said secondary winding of said first transformer to one of said control terminals, second diode rectifier means and balancing resistance means connecting said secondary winding of said first transformer through said second secondary winding of said second transformer to said silicon controlled rectifier device to cause said device to be normally conductive, and further means connecting the other of said control terminals to said silicon controlled rectifier device to cause said device to become non-conductive in response to a resistance variation in said sensing element.

7. An electric control circuit including in combination: input terminal means for connecting the control circuit to a source of alternating-current voltage; output terminal means; a first transformer having a primary winding connected across said input terminal means and having a secondary winding; a second transformer having a primary winding and first and second secondary windings; circuit means including said primary winding of said second transformer connecting said input terminal means to said output terminal means; means including a silicon controlled rectifier switching device having a gate electrode, having an anode connected to an intermediate tap on said first secondary winding of said second transformer, and having a cathode connected to an intermediate tap on said secondary winding of said first transformer for selectively reducing the impedance of said primary winding of said second transformer and increase the current flow from said input terminal means to said output terminal means; a pair of control terminals for connection to a variable resistance sensing element; and a bridge network including first diode rectifier means connecting the extremities of said secondary winding of said first transformer to one of said control terminals, second diode rectifier means and balancing resistance means connecting the extremities of said secondary winding of said first transformer through said second secondary winding of said second transformer to the gate electrode of said silicon controlled rectifier device to cause said device to be normally conductive, and means connecting the other of said control terminals to the gate electrode of said silicon controlled rectifier device to cause said device to become non-conductive in response to a resistance variation in said sensing element.

References Cited by the Examiner

UNITED STATES PATENTS

| | | | |
|---|---|---|---|
| 2,884,578 | 4/1959 | Bradburn et al. | 318—513 X |
| 2,975,976 | 3/1961 | Smith et al. | 323—89 X |
| 3,071,718 | 1/1963 | Gordon | 318—473 |
| 3,182,249 | 5/1965 | Pahlavan | 323—87 |

LLOYD McCOLLUM, *Primary Examiner.*

W. E. RAY, *Assistant Examiner.*